United States Patent [19]

Kato et al.

[11] Patent Number: 5,091,238

[45] Date of Patent: Feb. 25, 1992

[54] FLOPPY DISK COMPRISING A CELLULOSIC RESIN WITH A POLAR GROUP IN A SIDE CHAIN AND FERROMAGNETIC PARTICLES OF A SPECIFIC SURFACE AREA

[75] Inventors: Mikihiko Kato; Hiroshi Hashimoto; Yasushi Endo; Yasuo Nagashima, all of Kanagawa, Japan

[73] Assignee: Fuji Photo Film Co., Ltd., Kanagawa, Japan

[21] Appl. No.: 534,912

[22] Filed: Jun. 8, 1990

[30] Foreign Application Priority Data

Jun. 9, 1989 [JP] Japan .................................. 1-147655

[51] Int. Cl.⁵ ................................................. G11B 5/00
[52] U.S. Cl. ........................................... 428/64; 428/65; 428/694; 428/900; 428/402; 428/481; 428/425.1
[58] Field of Search ............... 428/900, 694, 402, 481, 428/425.1, 64, 65

[56] References Cited

U.S. PATENT DOCUMENTS 4,713,293 12/1987 Asano et al. .................... 428/403
4,937,098 6/1990 Nishikawa et al. ............... 427/132

FOREIGN PATENT DOCUMENTS 63-175221 11/1988 Japan .
1-079929 7/1989 Japan .

*Primary Examiner*—Merrell C. Cashion, Jr.
*Assistant Examiner*—Stevan A. Resan
*Attorney, Agent, or Firm*—Sughrue, Mion, Zinn, Macpeak & Seas

[57] ABSTRACT

A magnetic recording medium is disclosed, comprising a nonmagnetic support having thereon a magnetic layer comprising mainly ferromagnetic metal particles of a specific surface area and binder resins, wherein at least part of said binder resins is a cellulosic resin having in side chains of the molecules thereof a polar group which is a sulfonic acid group, a metal sulfonate group, a phosphoric acid group, or a metal phosphate group.

1 Claim, No Drawings

FLOPPY DISK COMPRISING A CELLULOSIC RESIN WITH A POLAR GROUP IN A SIDE CHAIN AND FERROMAGNETIC PARTICLES OF A SPECIFIC SURFACE AREA

FIELD OF THE INVENTION

The present invention relates to a magnetic recording medium. More particularly, it relates to a coating type magnetic recording medium which uses ferromagnetic metal particles and shows an excellent running durability.

BACKGROUND OF THE INVENTION

In the field of magnetic recording media having a magnetic layer consisting mainly of ferromagnetic particles and a binder resin, there is a growing demand for higher—density recording. Smoothing the surfaces of the magnetic layers is one of the known measures to satisfy such demand.

However, the enhanced surface smoothness of the magnetic layer causes the coefficient of friction between the magnetic layer of the magnetic recording medium being running and the recording or reproducing device's parts in contact with the magnetic layer to be so heightened that the magnetic layer is apt to suffer damages or peel off in a relatively short period of use.

Floppy disks, in particular, are often used under severe high-temperature conditions as in durability tests. In such cases, the magnetic layers are occasionally apt to shed ferromagnetic particles, which may have caused clogging of magnetic heads.

Further, as an effective means for obtaining magnetic recording media that can record information at high densities, it is known to employ ferromagnetic metal particles as the ferromagnetic particles.

The use of ferromagnetic metal particles in a floppy disk, however, has been defective in that the magnetic layer is prone to suffer damages due to the rubbing contact of the magnetic layer with the liner in the jacket, and this may cause dropouts. This problem has often been encountered particularly when floppy disks are used under conditions of relatively high temperatures such as 50 to 60° C.

For improving the running durability of magnetic layers, it has been proposed to incorporate an abrasive agent (hard particles), such as corundum, silicon carbide, or chromium oxide, in magnetic layers. However, this technique is disadvantageous in that in order to fully produce the effect of improving the running durability of magnetic layers, the abrasive materials must be incorporated into the magnetic layers in considerably large amounts. Further, the incorporation of an abrasive agent has been insufficient in protecting the magnetic layer from being damaged by the liner.

In addition, the magnetic layers containing large proportions of abrasive agents cause excessive magnetic head wear etc. Furthermore, the incorporation of abrasive agents has been not preferred in that it is contrary to the way of improving electromagnetic characteristics by smoothing magnetic layers.

It has also been proposed to incorporate in magnetic layers a fatty acid or an ester of a fatty acid and an aliphatic alcohol, as a lubricant, so as to minimize the coefficient of friction.

For example, U.S. Pat. No. 3,833,412 proposes to incorporate a monobasic fatty acid having 4 carbon atoms or more, such as caprylic acid, lauric acid, or oleic acid, as a lubricant; U.S. Pat. No. 3,274,111 proposes to incorporate as a lubricant a fatty acid ester which is an ester of a monobasic fatty acid having 12 to 16 carbon atoms and an aliphatic alcohol having 3 to 12 carbon atoms, examples of such ester including butyl laurylate, lauryl palmitate, and butyl myristate; and U.S. Pat. No. 4,303,738 proposes to incorporate tridecyl stearate as a lubricant.

JP-A-55-157131 proposes to incorporate as a lubricant an ester of a higher fatty acid and a higher alcohol having a branched molecular structure, and also JP-A-59-186130 proposes to incorporate isocetyl stearate as a lubricant. (The term "JP-A" as used herein means an "unexamined published Japanese patent application".)

However, the incorporation of such lubricants adversely affects the strength of the magnetic layers, although the incorporation is effective in lowering the coefficient of friction. Thus, the incorporation of lubricants has been insufficient in the effect of preventing the magnetic layers from damage caused by contact with the liners.

Moreover, use of cellulosic resins, as binder resins, having the high modulus of elasticity and the excellent mechanical strength so as to improve the liner-abrasion resistance of magnetic layers is disclosed in, for example, JP-A-56-13519, JP-A-62-239316, JP-A-58-70424, JP-A-58-70425, JP-A-56-74833, JP-A-60-133527, JP-A-62-34326, JP-A-62-26628, JP-A-59-79428, JP-A-57-135439, JP-A-56-74832, and JP-A-59-188827.

Binder resins based on such conventional cellulosic resins including nitrocellulose, however, are insufficient in the ability to disperse ferromagnetic particles, so that not only the resulting magnetic layers cannot have a good surface property, but the packing density of ferromagnetic particles cannot be so heightened. Consequently, the use of conventional cellulosic resins has been ineffective in provision of magnetic recording media having excellent electromagnetic characteristics.

For attaining improved dispersion of ferromagnetic particles, incorporation of a carboxyl group in nitrocellulose has been proposed in, for example, JP-A-61-168120, JP-A-63-99276, JP-A-63-99271, and JP-B-63-14753. (The term "JP-B" as used herein means an "examined Japanese patent publication".) However, such nitrocellulose has been unable to produce a sufficient dispersing effect when the ferromagnetic particles to be dispersed are very fine metal particles having a specific surface area of, for example, 40 $m^2/g$.

SUMMARY OF THE INVENTION

The present invention has been completed in view of the conventional techniques described above.

Therefore, an object of the present invention is to provide a magnetic recording medium which has excellent electromagnetic characteristics as well as good durability and, hence, is best suited for use in floppy disks.

The above object of the present invention is accomplished with a magnetic recording medium comprising a nonmagnetic support having thereon a magnetic layer comprising mainly ferromagnetic metal particles and binder resins, wherein at least part of said binder resins is a cellulosic resin having in side chains of the molecules thereof a polar group which is a sulfonic acid group, a metal sulfonate group, a phosphoric acid group, or a metal phosphate group.

DETAILED DESCRIPTION OF THE INVENTION

In the magnetic recording medium of the present invention, ferromagnetic metal particles suited for high-density recording are employed as ferromagnetic particles and a cellulosic resin effective in improving the durability of the magnetic layer is employed as a binder resin. This cellulosic resin has, in side chains of the molecules thereof, a polar group which is a sulfonic acid group, a metal sulfonate group, a phosphoric acid group, or a metal phosphate group. Examples of metal in the above metal sulfonate group and metal phosphate group include sodium, potassium and lithium. Among these, sodium and potassium are preferred. Owing to the limitation of such specific polar group, the dispersion of the ferromagnetic metal particles in the binder resin is so good that the magnetic layer has a good surface property and the packing density of the ferromagnetic metal particles in the magnetic layer can be heightened. Therefore, the magnetic recording medium of the present invention can have both excellent electromagnetic characteristics and improved durability.

The incorporation of a sulfonic acid group, metal sulfonate group, phosphoric acid group, or metal phosphate group as a polar group in side chains of the molecules of the cellulosic resin employed in the magnetic layer of the magnetic recording medium of the present invention serves to heighten the mechanical strength of the magnetic layer and, hence, is particularly effective in improving the durability of the magnetic layer under the high-temperature conditions.

When the magnetic recording medium of the present invention is used to produce a floppy disk in particular, the magnetic layer of the recording medium can show excellent liner-abrasion resistance so that magnetic layer damage caused by rubbing contact with the liner during driving is diminished.

The above-described features of the magnetic recording medium of the present invention become pronounced particularly when the ferromagnetic metal particles employed have a specific surface area ($S_{BET}$) of 40 m$^2$/g or more.

As the cellulosic resin to be employed in the magnetic layer of the magnetic recording medium of tho present invention, nitrocellulose, cellulose acetate, cellulose acetate butyrate, cellulose acetate propionate, or the like can be used. Among these, nitrocellulose and cellulose acetate propionate are preferred.

The content of the above-described polar group in the side chains of the molecules of the above cellulosic resin is generally from $1 \times 10^{-6}$ to $1 \times 10^{-3}$ equivalent, preferably from $1 \times 10^{-5}$ to $3 \times 10^{-4}$ equivalent, per g of the cellulosic resin.

If the content of the polar group is either too low or too high, the ability for dispersing ferromagnetic metal particles is insufficient and the solubility of the resin is also impaired.

As the backbone cellulosic resin, conventionally known cellulosic resins having a hydroxyl group or a nitro group may be employed.

The content of the above-described cellulosic resin in the binder resin in the magnetic layer of the magnetic recording medium of the present invention is generally from 25 to 70% by weight, preferably from 35 to 60% by weight, more preferably from 40 to 50% by weight.

If the cellulosic resin content in the binder resin is too low, the magnetic layer has insufficient mechanical strength, while if the content is too high, a problem that the magnetic layer becomes brittle and prone to peel off is caused.

The ferromagnetic metal particles employed in the magnetic recording medium of the present invention contain at least Fe. Specifically, the ferromagnetic metal particles may be particles of elemental metals or an alloy and consist mainly of Fe, Fe-Co, Fe-Ni, Fe-Co-Ni, or the like. For improving the properties of the ferromagnetic metal particles, a metal or non-metal such as B, C, Al, Si, P, etc., may be added to those components. Normally, the surfaces of the ferromagnetic metal particles have been covered with a layer of oxide in order to improve the stability of the particles. Preferably, the ferromagnetic metal particles have a specific surface area (according to the BET method; $S_{BET}$) of 40 m$^2$/g or more and a crystallite size of 400 Å or less. It is also preferable that the acicular ratio (long axis/short axis) be 5 or more, the saturation magnetization be 110 emu/g or more(more preferably 120 emu/g or more), and the coercive force be 800 Oe (oersted) or more (more preferably 1200 Oe or more).

The binder resin employed in the magnetic layer of the magnetic recording medium of the present invention may contain a polyurethane resin and a hardener therefor which can be selected from various kinds of polyisocyanates in addition to the above-described cellulosic resin.

It is particularly preferred to use a polyurethane resin having two or more -OH groups per molecule and a trifunctional polyisocyanate. An especially preferred trifunctional polyisocyanate is the product of the addition reaction of 1 mole of trimethylpropane with 3 moles of tolylene diisocyanate.

Examples of polyisocyanates that can be used in forming the magnetic layer of the magnetic recording medium of the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; products of the reactions of these isocyanates with polyhydric alcohols; and polyisocyanates formed through condensation of isocyanates. Such polyisocyanates are commercially available under the trade names of: Coronate L, Coronate HL, Coronate 2030, Coronate 2031, Millionate MR, and Millionate MTL (manufactured by Nippon Polyurethane Industry Co., Ltd., Japan); Takenate D-102, Takenate D-110N, Takenate D-200, and Takenate D-202 (manufactured by Takeda Chemical Industries, Ltd., Japan); and Desmodule L, Desmodule IL, Desmodule N, and Desmodule HL (manufactured by Sumitomo Bayer Co., Ltd., Japan). These may be used alone, or used in combination of two or more thereof, taking advantage of differences in hardening reactivity. For the purpose of accelerating the hardening reaction, the polyisocyanate may be used in combination with a compound having a hydroxyl group or an amino group. This hydroxyl or amino group-containing compound desirably is polyfunctional.

The amount of the above-described binder resin used is generally from 5 to 350 parts by weight, preferably from 150 to 330 parts by weight, more preferably from 200 to 300 parts by weight, per 100 parts by weight of the ferromagnetic metal particles. For the purpose of further enhancing the ability for dispersing the ferromagnetic metal particles, it is desirable to incorporate in the polyurethane resin a proper amount of a functional group such as a carboxyl group, a metal carboxylate group, a sulfonic acid group, a metal sulfonate group, a hydroxyl group, an amino group, an epoxy group, or the like.

Examples of the nonmagnetic support employed in the magnetic recording medium of the present invention include films of various synthetic resins such as poly(ethylene terephthalate), polycarbonates, polyamides, and polyimides; and metal foils such as aluminum foil and stainless-steel foil.

In the magnetic layer of the magnetic recording medium of the present invention, a lubricant, carbon black, and an abrasive agent are normally incorporated along with the ferromagnetic metal particles and binder resin describe above. In addition to these, an antistatic agent, a dispersing agent, and other additives may be added if desired.

Examples of lubricants that can be incorporated in the magnetic layer of the magnetic recording medium of the present invention include silicone oil, graphite, molybdenum disulfide, boron nitride, graphite fluoride, fluorine-containing alcohols, polyolefins (e.g., polyethylene wax), polyglycols (e.g., poly(ethylene oxide) wax), alkyl phosphates, polyphenyl ethers, tungsten disulfide, an ester of a monobasic fatty acid having 10 to 20 carbon atoms and at least one monohydric alcohol having 3 to 12 carbon atoms or di-, tri-, tetra- or hexahydric alcohol having 3 to 12 carbon atoms, and an ester of a monobasic fatty acid having 10 or more carbon atoms and a mono- to hexahydric alcohol having carbon atoms in such a number that the sum of the carbon atoms in the alcohol and those in the acid is between 11 and 28. Further, fatty acids, fatty acid amides, and aliphatic alcohols each having 8 to 22 carbon atoms may be used as lubricant. Specific examples of these organic lubricants include butyl caprylate, octyl caprylate, ethyl laurate, butyl laurate, octyl laurate, ethyl myristate, butyl myristate, octyl myristate, ethyl palmitate, butyl palmitate, octyl palmitate, ethyl stearate, butyl stearate, octyl stearate, amyl stearate, anhydrosorbitan monostearate, anhydrosorbitan distearate, anhydrosorbitan tristearate, anhydrosorbitan tetrastearate, oleyl oleate, oleyl alcohol, and lauryl alcohol. Furthermore, so-called lubricating oil additives may also be used alone as the lubricant for use in the present invention. Examples of such lubricating oil additives include antioxidants (e.g., alkylphenols), rust preventives (e.g., naphthenic acid, alkenylsuccinic acids, and dilauryl phosphate), oiliness improvers (e.g., colza oil and lauryl alcohol), extreme pressure additives (e.g., dibenzyl sulfide, tricresyl phosphate, and tributyl phosphite), detergent-dispersing agents, viscosity-index improvers, pour-point depressants, and anti-foaming agents These lubricants may be incorporated in an amount of from 0.05 to 20 parts by weight per 100 parts by weight of the binder.

Examples of dispersing agents that can be incorporated in the magnetic layer of the magnetic recording medium of the present invention include fatty acids having 10 to 22 carbon atoms ($R^1COOH$, where $R^1$ is an alkyl group having 9 to 21 carbon atoms) such as caprylic acid, capric acid, lauric acid, myristic acid, palmitic acid, stearic acid, oleic acid, elaidic acid, linoleic acid, linolenic acid, and stearolic acid; metallic soaps obtained from the above mentioned fatty acids and metals such as alkali metals (e.g., Li, Na, and K), alkaline earth metals (e.g., Mg, Ca, and Ba), Cu, and Pb; and lecithin. In addition to these, examples of dispersing agents further include higher alcohols having 4 carbon atoms or more (e.g., butanol, octyl alcohol, myristyl alcohol, stearyl alcohol) and sulfates and phosphates of such alcohols. These dispersing agents may be incorporated in an amount of from 0.005 to 20 parts by weight per 100 parts by weight of the binder resin. The method for using such dispersing agents is not particularly limited. For example, the dispersing agent may be allowed to adhere to the surfaces of the ferromagnetic fine particles or nonmagnetic fine particles beforehand, or may be added when these particles are being dispersed.

Examples of antistatic agents which can be used in the present invention include electrically conductive powders such as graphite powder, carbon black, and carbon black graft polymer powder; natural surfactants such as saponin; nonionic surfactants such as ones of the alkylene oxide type, the glycerin type, or the glycidol type, polyhydric alcohols, esters of polyhydric alcohols, and adducts of alkylphenolethylene oxide; cationic surfactants such as (higher alkyl)amines, cyclic amines, hydantoin derivatives, amidoamines, ester-amides, quaternary ammonium salts, heterocyclic compounds including pyridine, and phosphonium or sulfonium compounds; anionic surfactants containing an acid radical such as a carboxylic, sulfonic, or phosphoric acid radical or a sulfate or phosphate radical; amino acids; and ampholytic surfactants such as aminosulfonic acids, esters of sulfuric or phosphoric acid and aminoalcohols, and alkylbetaine-type surfactants.

Examples of carbon black which can be employed in the magnetic layer according to the present invention include furnace black for rubbers, thermal black for rubbers, coloring black, and acetylene black. These carbon blacks are known in the United States under, for example, the following abbreviations: SAF, ISAF, IISAF, T, HAF, SPF, FF, FEF, HMF, GPF, APF, SRF, MPF, ECF, SCF, CF, FT, MT, HCC, HCF, MCF, LFF and RCF. Carbon blacks which fall under ASTM D-1765-82a may be used. The carbon black which may be employed in the present invention has an average particle size of from 5 to 1,000 m$\mu$ (electron microscope), a specific surface area as measured by the nitrogen adsorption method of from 1 to 800 m$^2$/g, a pH of from 4 to 11 (JIS K-6221, 1982), and an oil absorption as measured with dibutyl phthalate (DBP) of from 10 to 800 ml/100g (JIS K-6221, 1982). According to the present invention, carbon black having particle sizes of from 5 to 100 m$\mu$ may be used for reducing the surface electric resistance of a coated film, and carbon black of from 50 to 1,000 m$\mu$ may be used for controlling the strength of a coated film. Further, fine carbon black (100 m$\mu$ or less) may be used for controlling the surface roughness of a coated film so as to smooth the surface and reduce the spacing loss, while coarse carbon black (50 m$\mu$ or more) may be used in combination with other type of carbon black for effectively roughening the surface of a coated film so as to decrease its friction coefficient.

As the abrasive agent which can be employed in the magnetic layer of the magnetic recording medium of the present invention, materials generally used to abrade or polish may be used. Examples of the abrasive agent include $\alpha$-alumina, molten alumina, silicon carbide, chromium oxide, cerium oxide, corundum, artificial diamond, $\alpha$-iron oxide, garnets, emery (main ingredients: corundum and magnetite), silica, silicon nitride, boron nitride, molybdenum carbide, boron carbide, tungsten carbide, titanium carbide, tripoli, diatom earth, and dolomite. These abrasive agents, which mostly have Mohs' hardnesses of 6 or more, may be used alone, or two to four thereof may be used in combination. The average particle size of the abrasive agent is generally from 0.005 to 5 μm, preferably from 0.05 to 2 μm. The amount of the abrasive agent incorporated in the magnetic layer is generally in the range of from 0.01 to 20 parts by weight per 100 parts by weight of the binder.

The magnetic layer in the magnetic recording medium of the present invention has a surface roughness of generally from 0.005 to 0.02 μm, preferably from 0.005 to 0.015 μm, in terms of average center line roughness Ra defined by JIS B 0601 (cut-off value: 0.25 mm).

For forming a magnetic layer containing the ferromagnetic metal particles, the binder resin, and other components including carbon black and the above-described ester compound on a nonmagnetic support, an organic solvent is added to these ingredients and the resulting mixture is kneaded to disperse or dissolve the ingredients to prepare a magnetic coating composition, which is then coated on a nonmagnetic support and dried to form a magnetic layer.

Examples of the organic solvent for use in the preparation of the magnetic coating composition include ketone-type compounds such as acetone, methyl ethyl ketone, methyl isobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, ethyl acetate, butyl acetate, isobutyl acetate, isopropyl acetate, ethyl lactate, and glycol acetate-monoethyl ether; glycol ethers such as ether, glycol dimethyl ether, glycol monoethyl ether, and dioxane; tar compounds (aromatic hydrocarbons) such as benzene, toluene, xylene, cresol, chlorobenzene, and styrene; chlorinated hydrocarbons such as methylene chloride, ethylene chloride, carbon tetrachloride, chloroform, ethylene chlorohydrin, and dichlorobenzene; N,N- dimethylformaldehyde; and hexane. Two or more of these compounds may be mixed in any desired ratio for use as the solvent In carrying out kneading, the ferromagnetic particles and the above-described other ingredients may be introduced into a kneading machine at a time or successively. For example, there may be employed a method in which the ferromagnetic particles are added to a solvent containing a dispersing agent and the resulting mixture is kept being stirred for a predetermined period of time to give a magnetic coating composition.

For the kneading and dispersion for obtaining the magnetic coating composition, various kneading machines may be used. Examples thereof include a two-roll mill, a three-roll mill, a ball mill, a pebble mill, a Trommel mill, a sand grinder, a Szegvari attritor, a high-speed impeller, a high-speed stone mill, a high-speed impact mill, a disper, a kneader, a high-speed mixer, a homogenizer, and an ultrasonic dispersing device.

Two or more layers may be formed on a nonmagnetic support simultaneously according to the technique of simultaneously applying a plurality of coating films, as shown in "Paint Flow and Pigment Dispersion" (written by T.C. Patton (1975)) which describes kneading and dispersion techniques.

The application of the magnetic coating composition to form a magnetic layer of the magnetic recording medium of the present invention is generally performed in such an amount as to have a magnetic layer thickness of from about 0.5 to 12 μm on a dry basis. If the magnetic layer is to be formed by repeated applications of the coating composition, the total thickness of the plural magnetic layers is regulated within the above range. The dry thickness of the magnetic layer is determined according to the use, shape, standards, etc. of the magnetic recording medium to be produced.

The magnetic coating thus formed on the nonmagnetic support is subjected, if desired, to treatment for orienting the ferromagnetic particles in the coated magnetic layer according to the method described in U.S. Pat. Nos. 4,324,177, 4,466,164, 4,499,121 and 4,100,326, and then dried to give a magnetic layer. If desired, the thus-obtained recording medium is subjected to surface-smoothing treatment and cut into desired shape, thereby producing the magnetic recording medium of the present invention according to the method described in U.S. Pat. Nos. 4,324,177, 4,466,164, 4,499,121 and 4,100,326.

It has been found that the surface-smoothing treatment of the magnetic layer is very effective in the present invention for imparting good surface smoothness and excellent abrasion resistance to the magnetic recording medium. This surface-smoothing treatment can be accomplished by smoothing treatment before drying or calendering treatment after drying.

As described above, by use of the specific cellulosic resin having a polar group such as a sulfonic acid group, a metal sulfonate group, a phosphoric acid group, or a metal phosphate group as the binder resin for the magnetic layer comprising mainly of ferromagnetic metal particles and the binder resin, a magnetic recording medium which is excellent in the electromagnetic characteristics and durability and is best suited for use in floppy disks can be obtained.

The novel effects of the present invention will be illustrated in more detail by reference to the following examples and comparative examples, in which all parts are by weight.

EXAMPLE 1

Composition for Magnetic Coating Composition

Ferromagnetic metal particles 100 parts (Fe content: 99% and Ni content: 1%; specific surface area ($S_{BET}$): 50 m /g; coercive force: 1,580 Oe, os: 130 emu/g):

SO$_3$Na group-containing cellulose 15 parts acetate propionate (weight-average molecular weight: 75,000; SO$_3$Na group content: $8 \times 10^{-5}$ eq/g):

Cr$_2$O$_3$ (average particle diameter 10 parts 0.5 μm):

Carbon black (Ketjen Black EC 10 parts manufactured by Lion Akzo Co., Ltd., Japan; average particle diameter: 30 mμ):

Carbon black (Thermax MT 3 parts manufactured by Cancarb Company; average particle diameter: 280 mμ):

Toluene 36 parts

Methyl ethyl ketone: 36 parts

The above magnetic coating composition was kneaded with a kneader for about 1 hour, and the following supplementary composition was then added thereto.

Supplementary Composition

Polyester polyurethane (UR 8300 10 parts manufactured by Toyobo Co., Ltd., Japan; sulfonic acid group content: 150 eq/10 g; weight-average molecular: 70,000):

Methyl ethyl ketone 250 parts

Toluene: 250 parts

The resulting mixture was subjected to dispersing treatment for about 2 hours with a sand grinder at a number of revolutions of 2,000.

To the dispersion obtained above were added 11 parts of tridecyl stearate and 10 parts of a polyisocyanate (Coronate L manufactured by Nippon Polyurethane Co., Ltd.). The resulting mixture was homogenized to obtain a magnetic coating composition.

This magnetic coating composition was coated on both sides of a nonmagnetic support which was a poly(ethylene terephthalate) film having a width of 30 cm and a thickness of 75 $\mu$m, by means of gravure rolls at a thickness of 3 $\mu$m on a dry basis for each side. The coating applied was dried at a temperature of about 100° C. and then calendered at about 40° C. to obtain a magnetic recording medium.

The thus-obtained magnetic recording medium was die-cut into the shape of 3.5-inch floppy disk and then housed in a floppy disk shell employing No. 9246 liner manufactured by Kendall Company to prepare a 3.5-inch floppy disk sample.

COMPARATIVE EXAMPLE 1

A 3.5-inch floppy disk sample was prepared in the same manner as in Example 1 except that 15 parts of vinyl chloride polymer MR 110 manufactured by Nippon Zeon Co., Ltd., Japan was used in place of 15 parts of the —$SO_3Na$ group-containing cellulose acetate propionate.

COMPARATIVE EXAMPLE 2

A 3.5-inch floppy disk sample was prepared in the same manner as in Example 1 except that 15 parts of cellulose acetate propionate CAP 482-20 (weight-average molecular weight: 75,000) manufactured by Eastman Chemical Company was used in place of 15 parts of the —$SO_3Na$ group-containing cellulose acetate propionate.

EXAMPLE 2

A 3.5-inch floppy disk sample was prepared in the same manner as in Example 1 except that 15 parts of —$OPO(OH)_2$ group-containing cellulose acetate butyrate (weight-average molecular weight: 40,000, polar group content: $1 \times 10^{-4}$ eq/g) was used in place of 15 parts of the —$SO_3Na$ group-containing cellulose acetate propionate.

COMPARATIVE EXAMPLE 3

A 3.5-inch floppy disk sample was prepared in the same manner as in Example 1 except that 15 parts of cellulose acetate butyrate CAB-500-1 (weight-average molecular weight: 80,000) manufactured by Eastman Chemical Company was used in place of 15 parts of the —$SO_3Na$ group-containing cellulose acetate propionate.

COMPARATIVE EXAMPLE 4

A 3.5-inch floppy disk sample was prepared in the same manner as in Example 1 except that 15 parts of nitrocellulose was used in place of 15 parts of the —$SO_3Na$ group-containing cellulose acetate propionate.

COMPARATIVE EXAMPLE 5

A 3.5-inch floppy disk sample was prepared in the same manner as in Example 1 except that 15 parts of vinyl chloride polymer MPR-TM (weight-average molecular weight: 52,000) manufactured by Nissin Chemical Co., Ltd., Japan was used in place of 15 parts of the —$SO_3Na$ group-containing cellulose acetate propionate.

COMPARATIVE EXAMPLE 6

A 3.5-inch floppy disk sample was prepared in the same manner as in Example 1 except that 15 parts of —COOH group-containing nitrocellulose CELNOVA EX-1 (weight-average molecular weight 16,000) manufactured by Asahi Chemical Industry Co., Ltd., Japan was used in place of 15 parts of the —$SO_3Na$ group-containing cellulose acetate propionate.

The floppy disk samples obtained above were evaluated for initial 2F output, and also evaluated for running durability in an atmosphere of 60° C., 30% RH under the following conditions.

Using 3.5-inch floppy disk drive FD-1135D (manufactured by NEC Corporation, Japan), the 3.5-inch floppy disk sample was continuously run at 360 rpm for 30 minutes, and the running durability was evaluated in terms of the number of passes counted before the output decreased to 80% of its initial value. If the output of the sample decreased to 45% of the initial value, this sample was regarded as one with dropouts.

The results are shown in Table 1 below.

TABLE 1

| Sample | Initial 2F output | Running durability ($\times$ 10,000) |
|---|---|---|
| Example 1 | 100% | 2500 no dropout |
| Example 2 | 101% | 2500 no dropout |
| Comparative Example 1 | 103% | 500 dropout occurred |
| Comparative Example 2 | 85% | 2000 dropout occurred |
| Comparative Example 3 | 83% | 2000 dropout occurred |
| Comparative Example 4 | 88% | 2000 dropout occurred |
| Comparative Example 5 | 82% | 500 dropout occurred |
| Comparative Example 6 | 88% | 2000 dropout occurred |

The samples of Examples 1 and 2, which were the magnetic recording media according to the present invention, gave good results with respect to both output and running durability.

The sample of Comparative Example 1, which employed a vinyl chloride polymer binder which is effective in dispersion of ferromagnetic metal particles, showed poor durability and undesired dropouts in the early stage of the test, although had high output.

The samples of Comparative Examples 2, 3, 4, and 6, each of which employed a cellulosic resin as part of the binder resin, showed relatively good durability, but their outputs decreased probably because the dispersion of the ferromagnetic metal particles had been insufficient.

While the invention has been described in detail and with reference to specific embodiments thereof, it will be apparent to one skilled in the art that various changes and modifications can be made therein without departing from the spirit and scope thereof.

What is claimed is:

1. A floppy disk comprising a nonmagnetic support having thereon a magnetic layer comprising mainly ferromagnetic metal particles and binder resins,
    wherein said ferromagnetic metal particles have a specific surface area of 40 $m^2/g$ or more and
    an amount of said binder resins is from 5 to 350 parts by weight per 100 parts by weight of the ferromagnetic metal particles, and wherein at least part of said binder resins is a cellulosic resin having in side chains of the molecules thereof a polar group which is a sulfonic acid group, a metal sulfonate group, a phosphoric acid group, or a metal phosphate group, and further wherein a content of said cellulosic resin is from 25 to 70% by weight based on the binder resins and a content of said polar group is from $1.10^{-6}$ to $1 \times 10^{-3}$ equivalent per g of the cellulosic resin.

* * * * *